US006961725B2

(12) United States Patent
Yuan et al.

(10) Patent No.: US 6,961,725 B2
(45) Date of Patent: Nov. 1, 2005

(54) METHOD OF A DATA RANGE SEARCH WITH PLURAL PRE-SET RULES

(75) Inventors: Kuo-Hua Yuan, Kaohsiung (TW); Wen-Jyh Chen, Hualien Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 412 days.

(21) Appl. No.: 10/228,232

(22) Filed: Aug. 24, 2002

(65) Prior Publication Data

US 2003/0217046 A1 Nov. 20, 2003

(30) Foreign Application Priority Data

May 16, 2002 (TW) ....................................... 91110210 A

(51) Int. Cl.[7] ................................................ G06F 17/30

(52) U.S. Cl. ............................... 707/4; 707/3; 707/101; 707/203

(58) Field of Search ................................ 707/3, 4, 101, 707/203

(56) References Cited

U.S. PATENT DOCUMENTS 6,778,984 B1 * 8/2004 Lu et al. ........................ 707/4

* cited by examiner

*Primary Examiner*—Charles Rones

(57) ABSTRACT

A search method for a range search with a plurality of pre-set rules constructs a rule mapping table by dividing data associated with the rules into a plurality of sub-keys and generating output tables for each sub-key. A rule column is formed for a rule by following through each sub-key based on the associated range of data. A first output table for the first sub-key and upper and lower output tables are generated for each remaining sub-key. All the rule columns are arranged in parallel to form the rule mapping table. The method of search is accomplished by dividing an input data into a plurality of sub-keys and each sub-key is used to search through the rule mapping table for determining a rule that is satisfied with the input data. If multiple rules are satisfied, a priority encoder selects a highest priority rule as the search result.

13 Claims, 15 Drawing Sheets

| data for the range search: 16 bits, number of rules: 1024 | | | | |
|---|---|---|---|---|
| number of sub-keys | length of each sub-key (bits) | number of output tables | required memory space (KBytes) | number of search |
| 1 | 16 | 1 | 8192 | 1 |
| 2 | 8 | 1+1*2=3 | 192 | 2 |
| 4 | 4 | 1+3*2=7 | 28 | 4 |
| 8 | 2 | 1+7*2=15 | 15 | 8 |
| 16 | 1 | 1+15*2=31 | 15.5 | 16 |

| Source IP | Dest. IP | Protocol | Source Port | Dest. Port | Service Quality |
|---|---|---|---|---|---|
| 140.96.115.X | X.X.X.X | 06 (TCP) | X | 80 (HTTP) | high |
| 140.96.116.X | 140.96.115.X | X | X | 20 ~ 80 | median |
| X.X.X.X | X.X.X.X | X | X | X | low |

| rule | start | end |
|---|---|---|
| 0 | 3 | 9 |
| 1 | 0 | 3 |
| 2 | 3 | 11 |
| 3 | 8 | 12 |
| 4 | 10 | 15 |
| 5 | 2 | 6 |
| 6 | 1 | 4 |
| 7 | 0 | 15 |

Rule table

| rule #0 | rule #1 | | | • • • • | | | rule #7 |
|---|---|---|---|---|---|---|---|
| 10 | 01 | 10 | 00 | 00 | 10 | 10 | 01 |
| 01 | 00 | 01 | 00 | 00 | 11 | 11 | 01 |
| 11 | 00 | 01 | 01 | 10 | 00 | 00 | 01 |
| 00 | 00 | 00 | 11 | 01 | 00 | 00 | 01 |
| 00 | 00 | 00 | 00 | 00 | 00 | 00 | 00 |
| 00 | 00 | 00 | 00 | 00 | 00 | 01 | 00 |
| 00 | 00 | 00 | 00 | 01 | 01 | 01 | 00 |
| 01 | 00 | 01 | 00 | 01 | 01 | 01 | 00 |
| 01 | 00 | 00 | 01 | 00 | 01 | 01 | 00 |
| 01 | 00 | 00 | 00 | 00 | 01 | 00 | 00 |
| 00 | 00 | 00 | 00 | 00 | 01 | 00 | 00 |
| 00 | 00 | 00 | 00 | 00 | 00 | 00 | 00 |

Rule mapping table

FIG. 6d

| rule | start | end |
|---|---|---|
| 0 | 3 | 9 |
| 1 | 0 | 3 |
| 2 | 3 | 11 |
| 3 | 8 | 12 |
| 4 | 10 | 15 |
| 5 | 2 | 6 |
| 6 | 1 | 4 |
| 7 | 0 | 15 |

Rule table

FIG. 7a

| rule #0 | rule #1 | • • • • | | | | | rule #7 |
|---|---|---|---|---|---|---|---|
| 10 | 10 | 10 | 00 | 00 | 10 | 10 | 10 |
| 11 | 00 | 11 | 11 | 11 | 00 | 00 | 11 |
| 00 | 01 | 00 | 00 | 00 | 00 | 00 | 01 |
| 00 | 01 | 00 | 00 | 00 | 00 | 01 | 01 |
| 00 | 01 | 00 | 00 | 00 | 01 | 01 | 01 |
| 01 | 01 | 01 | 00 | 00 | 01 | 01 | 01 |
| 01 | 00 | 01 | 00 | 00 | 01 | 01 | 01 |
| 01 | 00 | 01 | 00 | 00 | 01 | 00 | 01 |
| 01 | 00 | 01 | 00 | 00 | 01 | 00 | 01 |
| 01 | 00 | 01 | 00 | 00 | 00 | 00 | 01 |
| 01 | 00 | 01 | 01 | 00 | 00 | 00 | 01 |
| 01 | 00 | 01 | 01 | 00 | 00 | 00 | 01 |
| 00 | 00 | 01 | 01 | 01 | 00 | 00 | 01 |
| 00 | 00 | 01 | 01 | 01 | 00 | 00 | 01 |
| 00 | 00 | 00 | 01 | 01 | 00 | 00 | 01 |
| 00 | 00 | 00 | 00 | 01 | 00 | 00 | 01 |
| 00 | 00 | 00 | 00 | 01 | 00 | 00 | 01 |
| 00 | 00 | 00 | 00 | 01 | 00 | 00 | 01 |

Rule mapping table

FIG. 7d

Rule table

| Data length: 8 bits (0~255) | | |
|---|---|---|
| rule | start | end |
| 0 | 53 | 170 |
| 1 | 20 | 100 |
| 2 | 150 | 198 |
| 3 | 0 | 255 |

| Sub Key 1 | Sub Key 2 | Search Result by Sub key 2 | Search Result |
|---|---|---|---|
| 00 | 00 | not match | N |
| 00 | 01 | not match | N |
| 00 | 10 | not match | N |
| 00 | 11 | need expand | U |

Expand

| Sub Key 1 | Sub Key 2 | Sub Key 3 | Search Result by Sub Key 3 | Search Result |
|---|---|---|---|---|
| 00 | 11 | 00 | not match | N |
| 00 | 11 | 01 | need expand | U |
| 00 | 11 | 10 | exact match | M |
| 00 | 11 | 11 | exact match | M |

Expand

| Sub Key 1 | Sub Key 2 | Sub Key 3 | Sub Key 4 | Search Result by Sub Key 4 | Search Result |
|---|---|---|---|---|---|
| 00 | 11 | 01 | 00 | not match | N |
| 00 | 11 | 01 | 01 | exact match | M |
| 00 | 11 | 01 | 10 | exact match | M |
| 00 | 11 | 01 | 11 | exact match | M |

| Sub Key 1 | Sub Key 2 | Search Result by Sub Key 2 | Search Result |
|---|---|---|---|
| 10 | 00 | exact match | M |
| 10 | 01 | exact match | M |
| 10 | 10 | need expand | L |
| 10 | 11 | not match | N |

Expand

| Sub Key 1 | Sub Key 2 | Sub Key 3 | Search Result by Sub Key 3 | Search Result |
|---|---|---|---|---|
| 10 | 10 | 00 | exact match | M |
| 10 | 10 | 01 | exact match | M |
| 10 | 10 | 10 | need expand | L |
| 10 | 10 | 11 | not match | N |

Expand

| Sub Key 1 | Sub Key 2 | Sub Key 3 | Sub Key 4 | Search Result by Sub Key 4 | Search Result |
|---|---|---|---|---|---|
| 10 | 10 | 10 | 00 | not match | M |
| 10 | 10 | 10 | 01 | exact match | M |
| 10 | 10 | 10 | 10 | exact match | M |
| 10 | 10 | 10 | 11 | exact match | N |

FIG. 8c

Rule Mapping Table of Rule #0

| characteristics | Sub Key | Search Result | Result Encode |
|---|---|---|---|
| first search (Address by Sub Key 1) | 00 | U | 10 |
| | 01 | M | 01 |
| | 10 | L | 11 |
| | 11 | N | 00 |
| upper output table of the 2nd level (Address by Sub Key 2) | 00 | N | 00 |
| | 01 | N | 00 |
| | 10 | N | 00 |
| | 11 | U | 10 |
| lower output table of the 2nd level (Address by Sub Key 2) | 00 | M | 01 |
| | 01 | M | 01 |
| | 10 | L | 11 |
| | 11 | N | 00 |
| upper output table of the 3rd level (Address by Sub Key 3) | 00 | N | 00 |
| | 01 | U | 10 |
| | 10 | M | 01 |
| | 11 | M | 01 |
| lower output table of the 3rd level (Address by Sub Key 3) | 00 | M | 01 |
| | 01 | M | 01 |
| | 10 | L | 11 |
| | 11 | N | 00 |
| upper output table of the 4th level (Address by Sub Key 4) | 00 | N | 00 |
| | 01 | M | 01 |
| | 10 | M | 01 |
| | 11 | M | 01 |
| lower output table of the 4th level (Address by Sub Key 4) | 00 | M | 01 |
| | 01 | M | 01 |
| | 10 | M | 01 |
| | 11 | N | 00 |

FIG. 8d

| data for the range search: 16 bits, number of rules: 1024 | | | | |
|---|---|---|---|---|
| number of sub-keys | length of each sub-key (bits) | number of output tables | required memory space (KBytes) | number of search |
| 1 | 16 | 1 | 8192 | 1 |
| 2 | 8 | 1+1*2=3 | 192 | 2 |
| 4 | 4 | 1+3*2=7 | 28 | 4 |
| 8 | 2 | 1+7*2=15 | 15 | 8 |
| 16 | 1 | 1+15*2=31 | 15.5 | 16 |

FIG. 9

```
parameter INIT = 2'b00,
          LOOKUP = 2'b01,
          FINAL = 2'b10,
          IGNORE = 2'b11;

always @ (posedge clk or negedge rst_n) begin
      if (!rst_n)begin
          state <= INIT;
          out <= 0;
      end
      case(state)
      INIT : begin
              if (in = = 2'b00) begin
                out <= 0;
                state <= FINAL;
              end
               else if (in = = '2'b01)
                  out <= 1;
                  state <= FINAL;
               end
                else if (in = = '2'b10)
                   state <= LOOKUP;
               else
                  state <= IGNORE;
       end
       LOOKUP : begin
               if (in = = 2'b00) begin
                  out <= 0;
                  state <= FINAL;
               end
                else if (in = = 2'b01)
                   out <= 1;
                   state <= FINAL;
                end
                  else
                     state <= IGNORE;
       end
       FINAL : begin
                  out <= out;
                  state <= FINAL;
       end
       IGNORE : begin
               state <= LOOKUP;
       end
end//end always
```

FIG. 10 state = INIT (state[1]=0, state[0]=0)

| state[1] | state[0] | in[1] | in[0] | Out | A | B | C | D | E | F | G | H | Next state[1] | Next state[0] | Next Out |
|---|---|---|---|---|---|---|---|---|---|---|---|---|---|---|---|
| 0 | 0 | 0 | 0 | 0 | 1 | 1 | 0 | 0 | 1 | 1 | 1 | 0 | 1 | 0 | 0 |
| 0 | 0 | 0 | 0 | 1 | 1 | 1 | 0 | 0 | 1 | 1 | 1 | 0 | 1 | 0 | 0 |
| 0 | 0 | 0 | 1 | 0 | 0 | 0 | 0 | 0 | 1 | 1 | 1 | 0 | 1 | 0 | 1 |
| 0 | 0 | 0 | 1 | 1 | 0 | 0 | 0 | 0 | 1 | 1 | 1 | 0 | 1 | 0 | 1 |
| 0 | 0 | 1 | 0 | 0 | 1 | 1 | 1 | 1 | 1 | 0 | 1 | 0 | 0 | 1 | 0 |
| 0 | 0 | 1 | 0 | 1 | 1 | 1 | 1 | 1 | 1 | 0 | 1 | 1 | 0 | 1 | 1 |
| 0 | 0 | 1 | 1 | 0 | 0 | 0 | 1 | 1 | 1 | 1 | 1 | 0 | 1 | 1 | 0 |
| 0 | 0 | 1 | 1 | 1 | 0 | 0 | 1 | 1 | 1 | 1 | 1 | 1 | 1 | 1 | 1 |

state = LOOKUP (state[1]=0, state[0]=1)

| state[1] | state[0] | in[1] | in[0] | Out | A | B | C | D | E | F | G | H | Next state[1] | Next state[0] | Next Out |
|---|---|---|---|---|---|---|---|---|---|---|---|---|---|---|---|
| 0 | 1 | 0 | 0 | 0 | 0 | 0 | 0 | 0 | 1 | 1 | 1 | 0 | 1 | 0 | 0 |
| 0 | 1 | 0 | 0 | 1 | 0 | 0 | 0 | 0 | 1 | 1 | 1 | 0 | 1 | 0 | 0 |
| 0 | 1 | 0 | 1 | 0 | 0 | 0 | 0 | 0 | 1 | 1 | 1 | 1 | 1 | 0 | 1 |
| 0 | 1 | 0 | 1 | 1 | 0 | 0 | 0 | 0 | 1 | 1 | 1 | 1 | 1 | 0 | 1 |
| 0 | 1 | 1 | 0 | 0 | 0 | 0 | 1 | 1 | 1 | 1 | 1 | 0 | 1 | 1 | 0 |
| 0 | 1 | 1 | 0 | 1 | 0 | 0 | 1 | 1 | 1 | 1 | 1 | 1 | 1 | 1 | 1 |
| 0 | 1 | 1 | 1 | 0 | 0 | 0 | 1 | 1 | 1 | 1 | 1 | 0 | 1 | 1 | 0 |
| 0 | 1 | 1 | 1 | 1 | 0 | 0 | 1 | 1 | 1 | 1 | 1 | 1 | 1 | 1 | 1 |

state = FINAL (state[1]=1, state[0]=0)

| state[1] | state[0] | in[1] | in[0] | Out | A | B | C | D | E | F | G | H | Next state[1] | Next state[0] | Next Out |
|---|---|---|---|---|---|---|---|---|---|---|---|---|---|---|---|
| 1 | 0 | 0 | 0 | 0 | 1 | 1 | 0 | 1 | 0 | 1 | 0 | 0 | 1 | 0 | 0 |
| 1 | 0 | 0 | 0 | 1 | 1 | 1 | 0 | 1 | 0 | 1 | 0 | 1 | 1 | 0 | 1 |
| 1 | 0 | 0 | 1 | 0 | 0 | 1 | 0 | 1 | 0 | 1 | 0 | 0 | 1 | 0 | 0 |
| 1 | 0 | 0 | 1 | 1 | 0 | 1 | 0 | 1 | 0 | 1 | 0 | 1 | 1 | 0 | 1 |
| 1 | 0 | 1 | 0 | 0 | 1 | 1 | 0 | 1 | 0 | 1 | 0 | 0 | 1 | 0 | 0 |
| 1 | 0 | 1 | 0 | 1 | 1 | 1 | 0 | 1 | 0 | 1 | 0 | 1 | 1 | 0 | 1 |
| 1 | 0 | 1 | 1 | 0 | 0 | 1 | 0 | 1 | 0 | 1 | 0 | 0 | 1 | 0 | 0 |
| 1 | 0 | 1 | 1 | 1 | 0 | 1 | 0 | 1 | 0 | 1 | 0 | 1 | 1 | 0 | 1 |

state = IGNORE (state[1]=1, state[0]=1)

| state[1] | state[0] | in[1] | in[0] | Out | A | B | C | D | E | F | G | H | Next state[1] | Next state[0] | Next Out |
|---|---|---|---|---|---|---|---|---|---|---|---|---|---|---|---|
| 1 | 1 | 0 | 0 | 0 | 0 | 1 | 1 | 1 | 1 | 0 | 0 | 0 | 0 | 1 | 0 |
| 1 | 1 | 0 | 0 | 1 | 0 | 1 | 1 | 1 | 1 | 0 | 0 | 1 | 0 | 1 | 1 |
| 1 | 1 | 0 | 1 | 0 | 0 | 1 | 1 | 1 | 1 | 0 | 0 | 0 | 0 | 1 | 0 |
| 1 | 1 | 0 | 1 | 1 | 0 | 1 | 1 | 1 | 1 | 0 | 0 | 1 | 0 | 1 | 1 |
| 1 | 1 | 1 | 0 | 0 | 0 | 1 | 1 | 1 | 1 | 0 | 0 | 0 | 0 | 1 | 0 |
| 1 | 1 | 1 | 0 | 1 | 0 | 1 | 1 | 1 | 1 | 0 | 0 | 1 | 0 | 1 | 1 |
| 1 | 1 | 1 | 1 | 0 | 0 | 1 | 1 | 1 | 1 | 0 | 0 | 0 | 0 | 1 | 0 |
| 1 | 1 | 1 | 1 | 1 | 0 | 1 | 1 | 1 | 1 | 0 | 0 | 1 | 0 | 1 | 1 |

FIG. 12

METHOD OF A DATA RANGE SEARCH WITH PLURAL PRE-SET RULES

FIELD OF THE INVENTION

The present invention generally relates to a method of a range search, and more specifically to a method and architecture for searching from a number of pre-set rules a rule that has a data range satisfied with an input data.

BACKGROUND OF THE INVENTION

Internet has provided diversified services in recent years. In addition to providing a search routing table for fulfilling the function of transferring data packets, a modern internet switch/router also provides the function of a virtual private network to allow secured data processing and establish a firewall for protecting the security in the network. Differentiated service can also be accomplished by providing different levels of quality service based on the result of packet classification. Furthermore, a layer four switch/router can direct packet data to backend servers in order to achieve the goal of load balancing. All these functions rely on the result of packet classification which is a vital technique to providing the above services.

A range search is a commonly used technique in searching for data. In the packet classification for TCP/IP network protocol, it is necessary to analyze the header of a packet in order to identify which data flow the packet belongs to. In general, the 32 bit source address, 32 bit destination address, 8 bit communication protocol, 16 bit source port number and 16 bit destination port number of the internet protocol are used for searching in the rule database.

A rule database usually allows some flexibility for an administrator to set up the rules. When the administrator establishes the rules, they may include don't care or range rules. For a range rule, a packet satisfying the rule must have an associated data value between the start value and the end value of the rule. FIG. 1 shows a table for setting up rules which uses a range search for packet classification.

After the administrator sets up the rules, a rule table is constructed for the rules and their associated data. FIG. 2 illustrates a rule table 201 that comprises a database of five 8 bit rules including rule #0, rule #2, . . . and rule #4. A rule has a data record in the database. In FIG. 2, each rule has an 8 bit data and each bit can be '0', '1', or 'X' (don't care). In addition, a rule that has a front order is usually given a higher priority. The construction of the table is dependent on the method used for the search algorithms.

With a rule table constructed, an input data is used as an input key to search for the rule that the input data can satisfy. As shown in FIG. 2, rules #1, #3 and #4 are the search results of input keys #0, #1 an #2 respectively. The rule table is used to find the data record that matches the input key. If more than one rule are satisfied with the input key, the lookup result is the rule that has the most front order and hence the highest priority.

FIG. 3 illustrates a straightforward method of a conventional range search. Assume there are n rules in the rule table. FIG. 3 shows an example in which n=8 and there are rule #0, rule #1, . . . , rule #7. The value of the input data serves as the input key. Eight identical comparator circuits in parallel receive the input key. Each rule has a corresponding comparator circuit to determine if the input key is within the data range of the rule. If the value of the input key is greater than or equal to the start value of the rule and less than or equal to the end value of the rule, the input key satisfies the rule and the output of the comparator circuit is 1. Otherwise, the output of the comparator circuit is 0. When there are multiple rules that are satisfied, a priority encoder is then used to find the highest priority rule among all the rules that are satisfied with the input key. This highest priority rule is the lookup result.

The straightforward method shown in FIG. 3 is equivalent to a linear search. Multiple comparator circuits are used in parallel in order to increase the speed of the linear search. The drawback of this method is that the comparator circuit has a long delay. When the number of bits in the data increases, the complexity of the comparator circuit also increases. Furthermore, when the number of rules increases, the circuit becomes too large to be implemented.

FIG. 4 illustrates another range search method. Assume there are n rules. The range of the n rules divides an input data into 2n+1 sections at most. Each section has a corresponding bit map having n bits. In the bit map, a bit 1 or 0 represents whether an input value satisfies or dissatisfies the corresponding rule. With reference to FIG. 4, section X5 is used as an example. If the input key value falls into section X5, both rule #1 and rule #2 are satisfied. Therefore, the bits corresponding to section X5 in the bit map have values '1', '1' and '0'. The table composed by the bitmaps is called rule mapping table. As shown in FIG. 4, the number of rules is 3 and the input data are divided into X1~X7 7 sections. Each section has a corresponding bitmap with 3 bits.

The method shown in FIG. 4 sets up the rule mapping table in advance. When the table is looked up, the value of the input data is used as the input key to perform a binary search. From the section into which the input key falls, the corresponding bitmap of the section can tell which rules are satisfied. The drawback of this method is that the rule mapping table is too large. If there are n rules, each bitmap has n bits. The total number of bits in the rule mapping table is n×(2n+1) that is proportional to the square of the number of the rules.

When the number of rules increases, the method illustrated in FIG. 4 requires a large amount of memory space. For example, 2M bits=256K bytes of memory are required for a rule mapping table to cover 1024 rules. In addition, an index table is required to record the boundary values of the 2n+1 sections in order for the binary search to find which section an input key value falls into. For 16 bit data with 1024 rules, the index table of this method is about 16×2×1024=32K bits=4K bytes. In terms of the search speed, the number of searches in the binary search is $1+\log_2 n$. In the hardware, it takes two clock cycles for every read from the table. Therefore, $2\times(1+\log_2 n)$ clock cycles are required to obtain the search result. If there are 1024 rules, it takes 11 search or 22 clock cycles.

Conventionally, data search can be accomplished by using content addressable memory (CAM). Take the 8×5 rule table shown in FIG. 2 as an example. The architecture using content addressable memory is shown in FIGS. 5*a* and 5*b*. As shown in FIG. 5*a*, the content addressable memory uses one rule register and one mask register to represent one rule in the rule table. Because the don't care bits in the rule are not used, the value in the mask register represents the bits that have to be compared in the rule. The value in the rule register represents if the bit for comparison in the rule is '1' or '0'. For example, rule #0 with a value 101×1×11 has a corresponding mask register '11101011'. If the don't care bits in the rule are set to '0' and other bits are set according to the bit values in the rule, the value of the corresponding rule register for rule #0 is '10101011'.

With reference to FIG. 5*b*, in the architecture of using the content addressable memory for a range search, the input key value is ANDed with the values in the mask registers to extract the bits that require comparison. These bits are then compared with the values in the rule registers to determine output values that are either 1 or 0. Finally, a priority encoder is used to find the highest priority rule among all the rules that are satisfied with the input key value if more than one rule are satisfied.

Although the content addressable memory can be used to implement a fast and efficient range search, the cost of hardware is very high. Some cost may be saved because there are don't care bits in the rule table implemented by the content addressable memory. If the data range is continuous and the range value, i.e., the difference between the end value and the start value, is a sum of multiple powers of 2, the rule can be represented by a single entry in the rule table. For example, a given rule with a data range from 152 to 159 has a binary representation from 10011000 to 10011111. The range value is $2^0+2^1+2^2=7$, which can be represented by a single rule table entry 10011xxx. In a different example which has a data range from 131 to 187 with a binary representation 10000011 to 101110111, the range value is $2^3+2^4+2^5=56$ which can also be represented by a single rule table entry 10xxx011.

However, if the range value is not a sum of multiple powers of 2, the rule has to be represented by multiple rule table entries. For example, a given rule with a data range from 150 to 160 is represented in binary by 11010100 to 10100000. At least three rule table entries including a data range from 150 to 151 represented by 1001011x, a data range from 152 to 159 represented by 10011xxx, and a date value 160 represented by 10100000. Another rule with a data range from 140 to 187, which is represented by 10000010 to 10111011, requires at least two rule table entries including a data value 130 represented by 10000010 and a data range from 131 to 187 represented by 10xxx011. As a result, the cost of memory is even more expensive if the range value is not a sum of multiple powers of 2.

From the above discussion, it can be seen that the conventional methods of constructing a rule table and performing a range search have the drawbacks that the rule table is too large and the number of searches is too many. When the number of rules gets larger, many of the conventional methods become infeasible or impractical. There is a strong demand in a range search method and architecture that can save memory hardware and reduce the number of searches.

SUMMARY OF THE INVENTION

The invention has been made to meet the demand of an efficient range search method and an architecture that can be implemented with simple hardware. The primary object of the invention is to provide a method for a range search with a plurality of pre-set rules. Accordingly, an architecture in which a rule column is constructed for the range search by dividing the data associated with a rule into a plurality of sub-keys and following through each sub-key based on the associated range of data of the rule. All the rule columns are arranged in parallel to form a rule mapping table. The method of range search is accomplished by dividing an input data into a plurality of sub-keys and each sub-key is used as the address to search through the rule mapping table for determining a rule that is satisfied with the input data.

The basic principle of the invention is to divide an input data into a plurality of sub-keys each having a number of bits. In the present invention, a rule mapping table having a rule column for each rule. Each rule column is formed by generating a first output table for a first sub-key, and an upper output table and a lower output table for each remaining sub-key according to the associated range of data of each rule. The entry in each output table is encoded and all output tables of each rule are arranged in order from top to bottom to form a rule column. The rule mapping table is then constructed by arranging all of the rule columns together.

According to the invention, in the construction of a rule column, the entry in the first output table may have four possible results including exact match, no match, further search in an upper output table or further search in a lower output table. The entries in an upper output table of a next sub-key may be exact match, no match or further search in an upper output table. The entries in a lower output table of a next sub-key may be exact match, no match, or further search in a lower output table.

After the rule mapping table is constructed, a range search for an input data can be performed. In the present invention, the input data is divided into a plurality of sub-keys each having a number of bits for the range search. The first sub-key is used as an address to search through the first output table of a rule column for a given rule. The search result may be exact match, no match, further search in an upper output table or further search in a lower output table. If the result is exact match or no match, the input data satisfies or dissatisfies the rule respectively and the search ends. Otherwise, the range search continues by using the next sub-key as an address to search for the upper or lower output tables of the next sub-key in the rule column until the result is exact match or no match.

The size of the rule mapping table constructed according to the invention depends on the number of bits in the associated range of data and the number of rules. The number of searches is independent of the number of rules because parallel searches for all the rules can be performed at the same time. If there are multiple rules that are satisfied with an input data, a priority encoder is used to select the rule that has a highest priority as the output of the search result.

According to the invention, the search result of each output table may result in further search in either an upper or a lower output table of a next sub-key. To speed up the search, both upper and lower output tables of the next sub-key are always searched. If a search result is not needed, it is then ignored. The invention also provides a simple circuit that processes the search results to determine the output of the range search. The circuit has four states including an initial state, a lookup state, an ignore state and a final state to receive the search result of each sub-key and properly determine if the input data satisfies the rule.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 6*a* shows an example of a table of 8 rules for a range search according to the present invention.

FIG. 6*d* shows a rule mapping table constructed according to the present invention in which a 4 bit input data is divided into a high order 2 bit sub-key and a low order 2 bit sub-key for the range search.

FIGS. 7*a*–7*d* show the construction of the rule mapping table and the range search for the example shown in FIGS. 6*a*–6*d* according to the present invention in which a 4 bit data is divided into a high order 1 bit sub-key and a low order 3 bit sub-key for the range search.

FIGS. 8*a*–8*d* show the range search of another example according to the invention in which an 8 bit data is divided into a plurality of 2 bit sub-keys for the range search.

FIG. 9 shows the sizes of the required memory space of a range search with 1024 rules and 16 bit input data by dividing the input data into 16 bit, 8 bit, 4 bit, 2 bit and 1 bit sub-keys for the range search according to the present invention.

FIG. 10 shows a Verilog description of a post stage circuit for the range search according to the present invention.

FIG. 12 shows the logic of each node on the circuit of FIG. 10.

DETAILED DESCRIPTION OF THE PREFERRED EMBODIMENTS

FIG. 6 illustrates an embodiment of the range search method according to the present invention. It is assumed that the data in the range search has 4 bits and there are 8 rules in the embodiment. FIG. 6*a* shows the eight rules. In the range search of this invention, a rule mapping table is first constructed. The range search is accomplished by using the input data as the input key which is divided into a plurality of sub-keys to search through the rule mapping table for determining the rule that is satisfied by the input data.

Figures 1, 2:
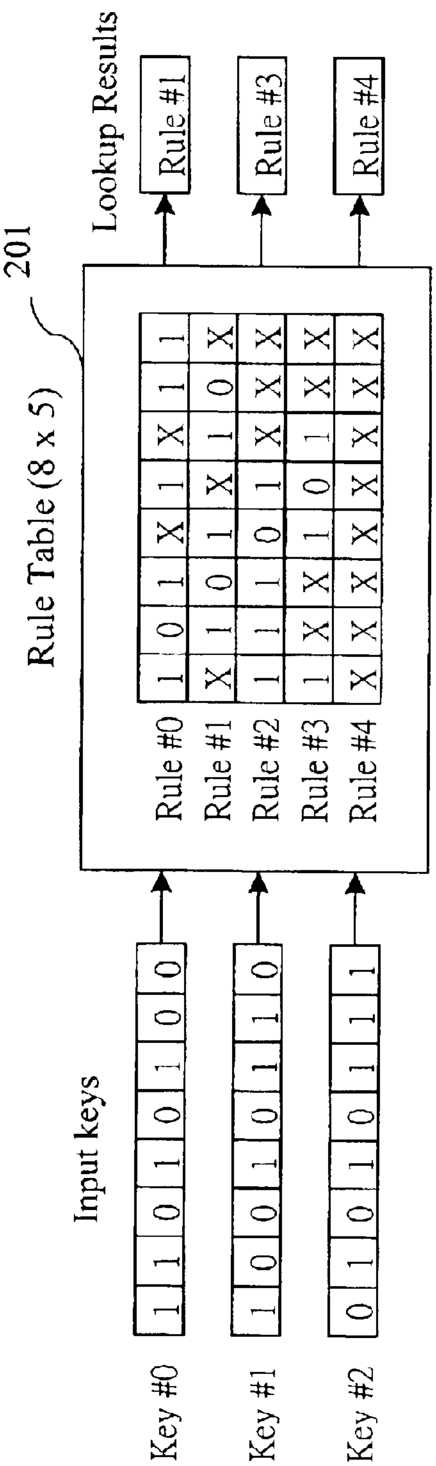
FIG. 1 shows a typical rule table for packet classification which requires a range search.
FIG. 2 shows a conventional rule table for 5 rules with 8 bit input data.
Figure 3:
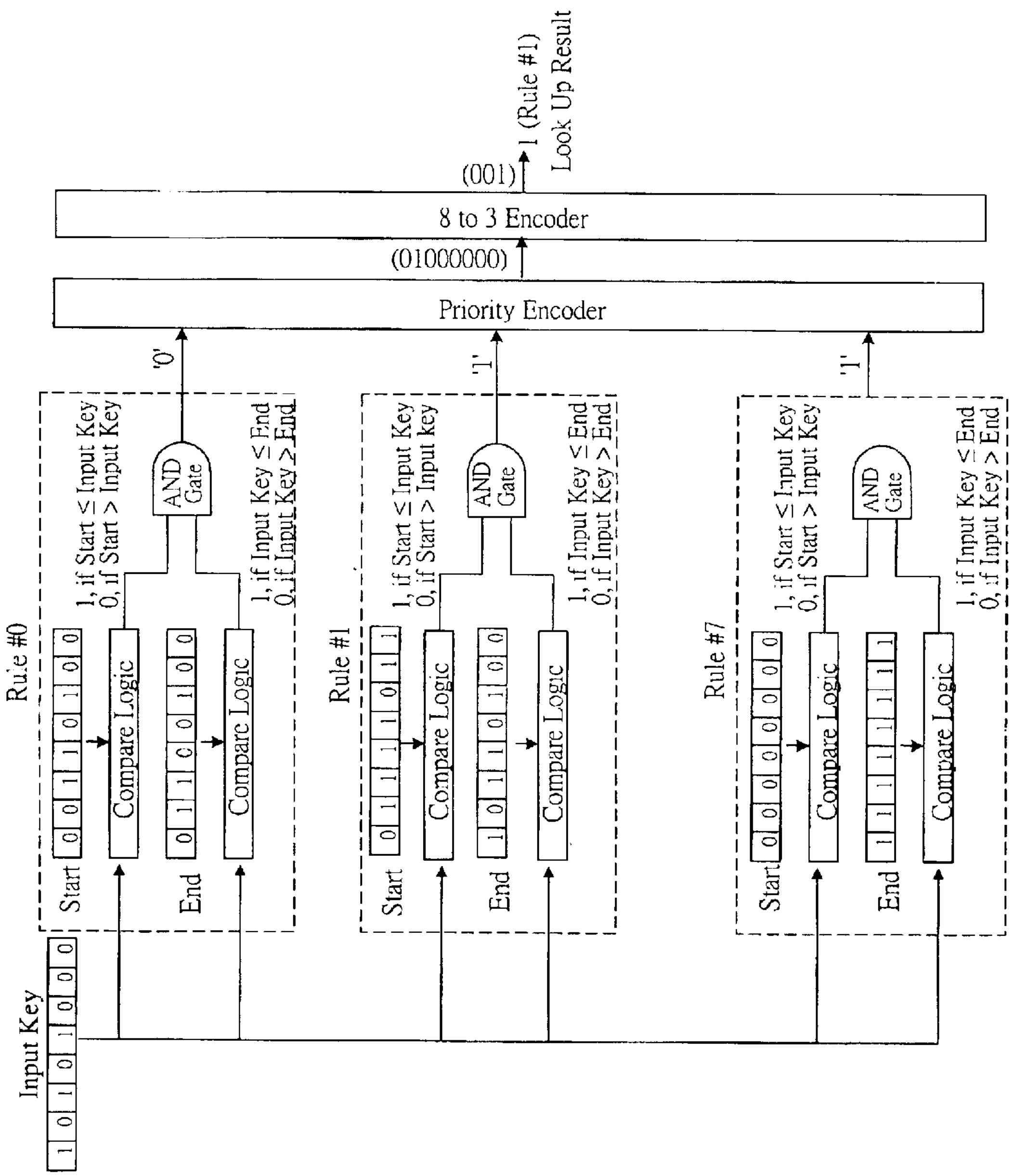
FIG. 3 shows a conventional range search technique in which comparators are used for the range search.
Figure 4:
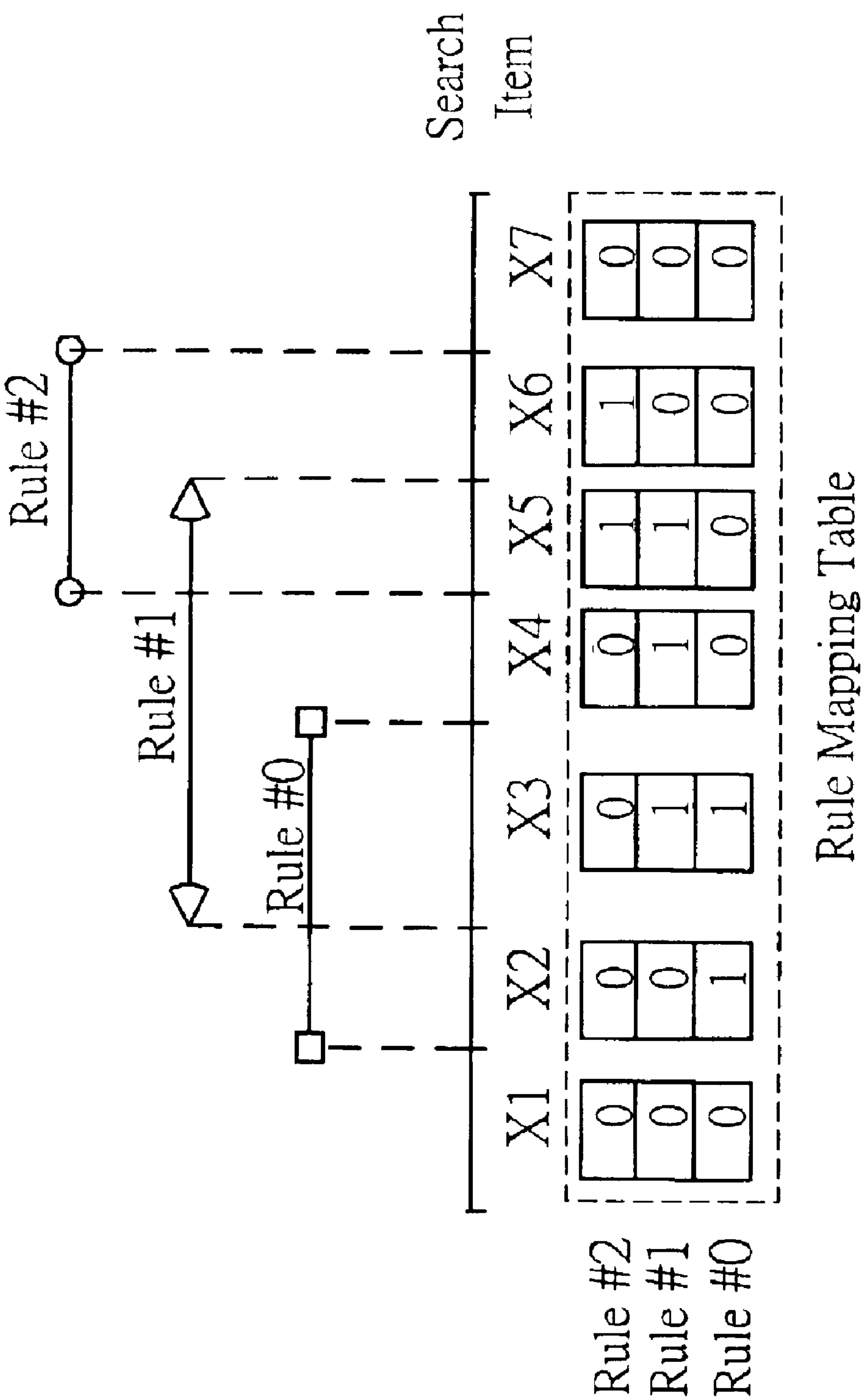
FIG. 4 shows another conventional range search technique in which an input data is used as the input key to do a binary search.
Figure 5A:
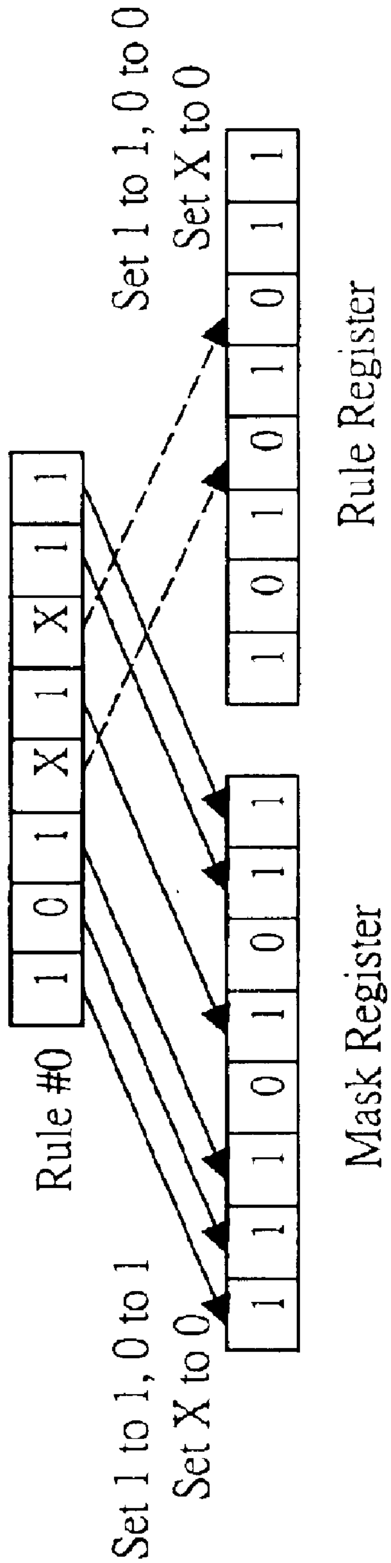
FIG. 5*a* shows that a rule register and a mask register are used to represent one rule using content addressable memory.
Figure 5B:
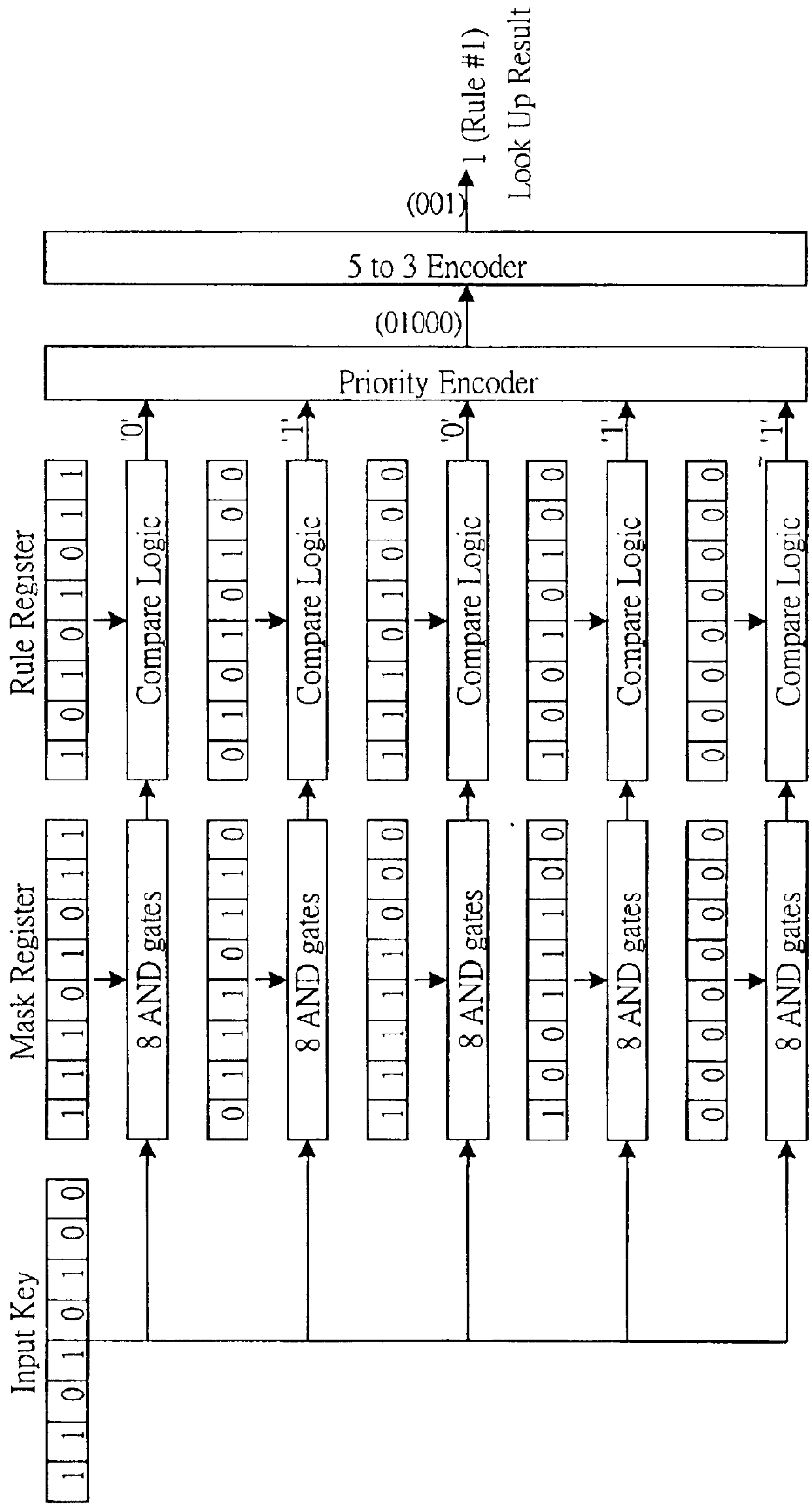
FIG. 5*b* shows an architecture of a range search using content addressable memory.
Figures 6B, 6C:
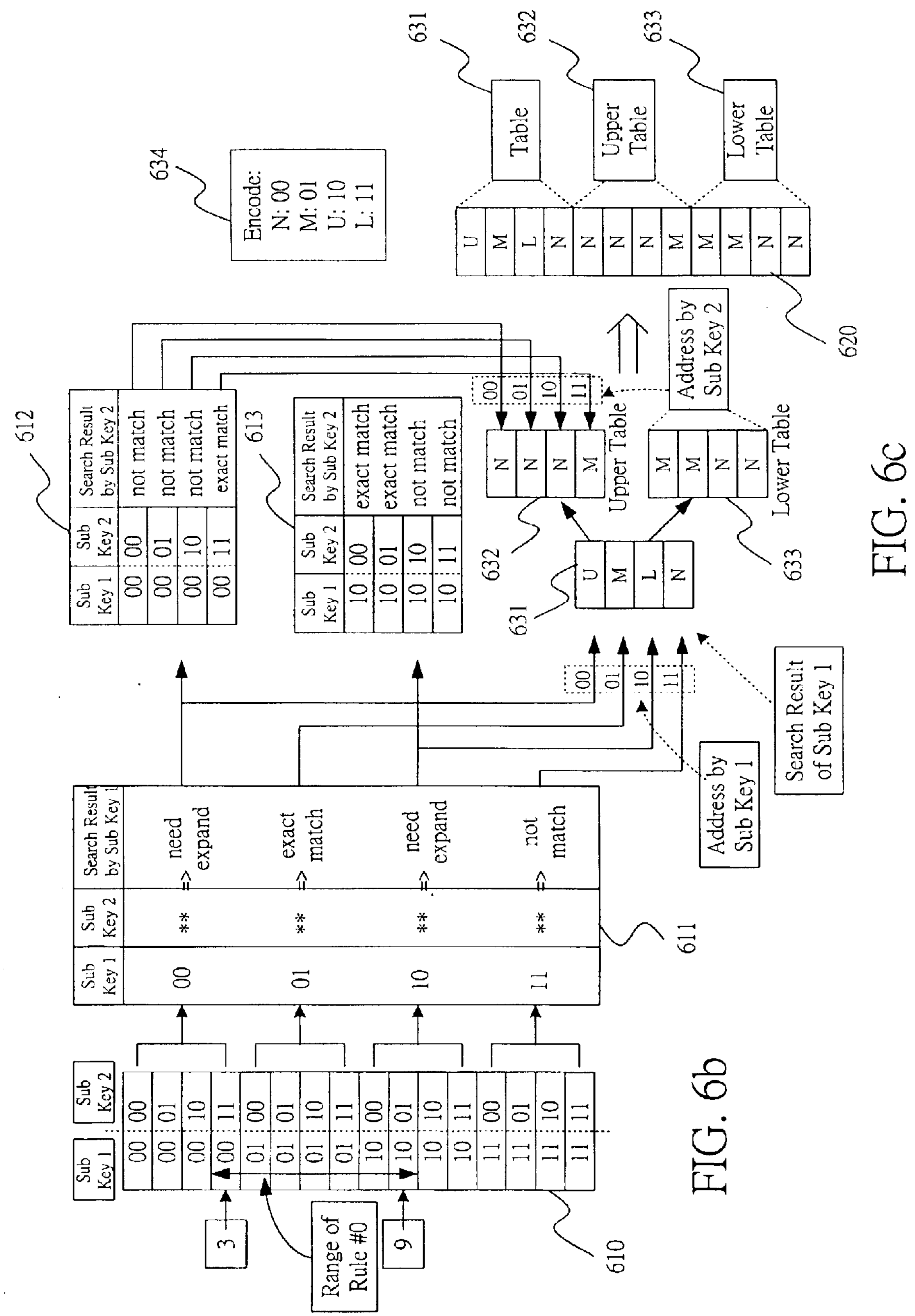
FIG. 6*b* shows that a 4 bit input data is divided into a high order 2 bit sub-key and a low order 2 bit sub-key according to the present invention.
FIG. 6*c* illustrates how a first output table, an upper output table and a lower output table are constructed for the rules shown in the table of FIG. 6*a* according to the present invention.

According to the first step of the method for constructing the rule mapping table in the present invention, the 4 bit input key is divided into a high order 2 bit first sub-key and a low order 2 bit second sub-key as shown in table 610 of FIG. 6*b*. The 4 bit input key value is in the range of 0 to 15 represented by 0000 to 1111 in binary. The second step of the method sequentially uses the possible values of each sub-key and the corresponding search results based on the rule table to set up a rule column for each rule. A rule mapping table is then constructed by arranging all the rule columns in parallel in a table.

With reference to rule #0 in the rule table of FIG. 6*a*, the start value and the end value arc 3 and 9 that are represented by 0011 and 1001 respectively in binary. It can be seen that when the value of the first sub-key is 00, the only possible value in the data range of rule #0 is 0011. Other values 0000 to 0010 are not within the range. Therefore, the first sub-key is not sufficient to determine if the input data is within the data range of rule #0 and further search is necessary. When the value of the first sub-key is 01, the four possible values from 0100 to 0111 are all within the data range of rule #0. Similarly, when the value of the first sub-key is 10, further search is necessary. When the value of the first sub-key is 11, none of the values is within the data range of rule #0.

Because the data range of a rule is usually a continuous range, the result table 611 shown in FIG. 6*c* illustrates four different search results from the top to the bottom, i.e., partially match, exact match, partially match and no match, if only the first sub-key is used to search. When the result is exact match or no match, no further processing is necessary and only the first sub-key is required for determining the rule that is satisfied as shown in FIG. 6*c*. In practice, if there are more bits in the input data, the result table from the top to the bottom may comprise five different search results including no match, partially match, exact match, partially match and no match.

FIG. 6*c* shows an output table 631 for the search using the first sub-key. In the first output table 631, U represents that further search is necessary, M represents that there is exact match, and L represents that further search is necessary, and N represents that there is no match for the first sub-key values 00, 01, 10 and 11 respectively. When the first sub-key value is 00, further search with an upper output table 632 is required. Similarly, when the first sub-key value is 10, further search with a lower output table 633 is required. The construction of the upper and lower output tables 632 and 633 is described in more detail in the following paragraphs.

With reference to the result table 612 shown in FIG. 6*c*, the low order 2 bits arc the value of the second sub-key which serves as the address of the result table. Except for the bottom entry 0011 that falls within the data range, the other three entries 0000, 0001, and 0010 do not match with rule #0. In other words, the search results using the second sub-key are N, N, N and M that form the upper output table 632 for second sub-key values 00, 01, 10 and 11 respectively. Similarly, according to the result table 613 shown in FIG. 6*c*, two entries 1000 and 1001 fall within the data range and the other two entries 1010 and 1011 do not match with rule #0. The search results using the second sub-key are M, M, N and N that form the lower output table 633 for second sub-key values 00, 01, 10 and 11 respectively.

The three output tables 631, 632 and 633 are arranged in a column to form the rule column 620 for rule #0. Each output entry in rule column 620 is encoded according to the encoding table 634. After the encoding, the output table forms a first column of the rule mapping table shown in FIG. 6*d*. Similarly, columns corresponding to rule #1, rule #2, . . . , and rule #7 are constructed to complete the rule mapping table of FIG. 6*d*.

After the rule mapping table is constructed, it is saved and used for the range search. The input data is divided into a number of sub-keys according to the sub-keys used to construct the rule mapping table. The value of each sub-key is used sequentially as the address for the search. All the results corresponding to each sub-key are extracted to determine how many rules the input data satisfies. In this embodiment, if the result corresponding to a sub-key in a rule is not 00 or 01, whether the rule is satisfied with the input data or not can not be determined yet and further search in the next level is required until the result is 00 or 01.

Take an example that the value of the input data is 8 and the first sub-key 10 of the binary representation 1000 is used for the range search. As shown in FIG. 6*d*, the results using the first sub-key 10 correspond to the third row of the first four rows 635 of the rule mapping table and the search results are 11, 00, 01, 01, 10, 00, 00, and 01. From these encoded values, it can be understood that rule #0 is partial match, rule #1 is no match, rules #2 and #3 are exact match, rule #4 is partial match, rules #5 and #6 are no match, and rule #7 is exact match. For partial match, the middle four rows 636 and the bottom four rows 637 that correspond to the upper and lower output tables discussed before have to be further searched by using the second sub-key to determine if the search result is either 00 or 01.

As can be seen in FIG. 6*d*, rules #0 and #4 require further search using the second sub-key according to the search result using the first sub-key. For the input data 8, the second sub-key is 00 in the lower two bits of the binary representation 1000. Because the output of the first sub-key in rule #0 is 11, the lower output table is searched and the first row in the bottom four rows 637 is addressed by the second sub-key and the output is 01 which indicates exact match. For rule #4, the first row in the middle four rows 636 is addressed by the second sub-key and the output is 00 because the output of the first sub-key in rule #4 is 10 and the upper output table is searched. Therefore, rule #4 is no match. Finally, a priority encoder determines the rule which has exact match and highest priority as the search result.

In the above example, the data in the range search only has 4 bits. The search result of the first sub-key may be U (11) or L (10) in addition to exact match (01) and no match (00). Therefore, an upper output table and a lower output table need to be constructed for further search using the second sub-key. Therefore, three output tables 631, 632 and 633 as illustrated in FIG. 6*c* are constructed in this example. However, if there are more bits in the data of the range search, the search results using the second sub-key may still have U or L in addition to exact match and no match. If the search result is either 00 or 01, the search ends. Otherwise, the next sub-key needs to be used for further search using the upper and lower output tables in the next level. As an example, if the data has 16 bits which are divided into four sub-keys each having 4 bits, the range search requires four searches to determine if a rule matches or not in the worst case.

According to the invention, only the first search results in further search in either the upper output table or the lower output table. After the second search, the search in the upper output table may only require further search in the upper output table in its next level. Similarly, the search in the lower output table may only require further search in the lower output table in its next level. The following will explain in more detail the characteristic of the method in this invention.

Because a data range is continuous, the upper or lower output table of the embodiment in the present invention is continuous. If NM represents no match, PM represents partial match, and EM represents exact match, the entries in an upper output table from the top to the bottom may be NM-PM, NM-EM, PM-EM or NM-PM-EM. The output table 632 in FIG. 6*c* has NM-EM. It is not possible for the table to comprise more than one PM. Therefore, an upper output table may only introduce an upper output table in its next level. Similarly, the lower output table from the top to the bottom may be EM-PM, EM-NM, PM-NM or EM-PM-NM. Two PM's do not exist at the same table in the second level and after. Therefore, a lower output table may only introduce another lower output table in its next level.

In the present invention, each entry in the output table may be exact match, no match, further search in an upper output table, and further search in a lower output table. The four possibilities are represented by 2 bits as shown in the encoding table 634 of FIG. 6*c*. The upper or lower output table in the last level can only be either exact match or no match. Therefore, only 0 or 1 is needed in the output tables of the last level. In other words, one bit of memory space is sufficient for each entry of the last level output table. Only half of the memory space is required as compared with the output tables of other levels. However, in order to maintain the uniformity in implementing the circuit, it is more convenient and practical to use two bits for the storage of each entry in the output tables even in the last level.

Figures 7B, 7C:
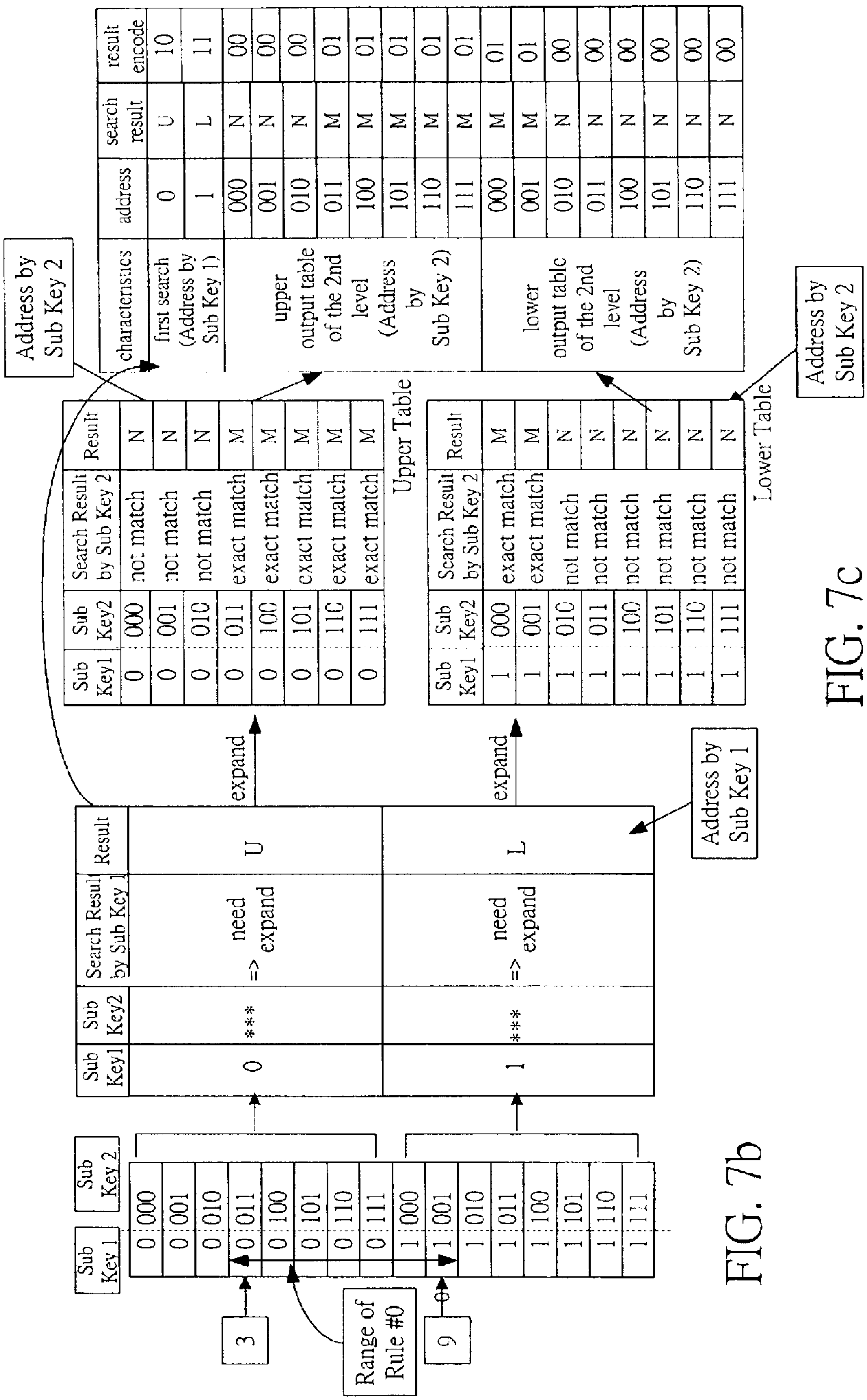

If the data in the range search has k×m bits, dividing the data into k sub-keys each having m bits is a preferred approach in this invention. It is also easier to implement the circuit. However, the method of this invention still applies if it is desirable to have sub-keys with different number of bits The circuit implementation may be less ideal. For example, FIGS. 7*a*–7*d* illustrate the construction of the rule mapping table and the range search of this invention using sub-keys with different number of bits. A 4 bit data in the range search is divided into one single bit sub-key and one 3 bit sub-key. Comparing the rule mapping tables of FIG. 6*d* and FIG. 7*d*, the size of the rule mapping table in FIG. 7*d* is larger than that of the rule mapping table in FIG. 6*d*. In practice, the circuit also becomes more complicated because of the sub-keys with different number of bits.

The flow of table construction according to the range search of the present invention is now described in detail. Assume the length of the data is n bits. There are k sub-keys having number of bits $m_1$, $m_2$, $m_3$, . . . , $m_k$. That is, $n=m_1+m_2+m_3$' . . . $+m_k$, wherein $m_1$, $m_2$, $m_3$, . . . , $m_k$ are all positive numbers.

According to the table construction of the present invention, the first output table for the first sub-key comprises $2\hat{\ }m_1$ entries, wherein $2\hat{\ }m_1$ stands for 2 to the power of $m_1$. The upper and lower output tables in the second level each comprise $2\hat{\ }m_2$ entries. The upper and lower output tables in the $k^{th}$ level each comprise $2\hat{\ }m_k$ entries. Every entry in each table is filled with 2 bit value that is dependent on whether the binary representation of each sub-key is within the data range. An example of the table construction has been illustrated in FIG. 6.

From FIG. 6, it can be seen that the first output table is addressed by $m_1$=2 bits. Therefore, it has 2^2=4 entries. When the first sub-key value is 00, it is necessary to search further in the upper output table of the second sub-key. The construction of the upper output table for the second sub-key is based on whether the binary representation of the second sub-key value is within the data range or not when the first sub-key value is 00. Because only 0011 is within the data range, the entries in the upper output table for the second sub-key are N, N, N and M for the address 00, 01, 10 and 11 respectively. These entries are then encoded as 00, 00, 00 and 01. Similarly, when the first sub-key value is 10, further search in the lower output table of the second sub-key is necessary. The entries in the lower output table for the second sub-key are M, M, N, and N that are encoded as 01, 01, 00 and 00 respectively. As it can be seen, the upper and lower output tables in the second level are addressed by the second sub-key that has $m_2$=2 bits. Therefore, each table has 4 entries.

In the example shown in FIG. 7, the 4 bit data is divided into two sub-keys. The first sub-key has $m_1$=1 bits and the second sub-key has $m_2$=3 bits. Therefore, the first output table has 2^1=2 entries and the upper and lower output tables of the second level have 2^3=8 entries each. The values in the entries are also determined by checking if the binary representation of the second sub-key is within the data range of the rules.

Figures 8A, 8B:
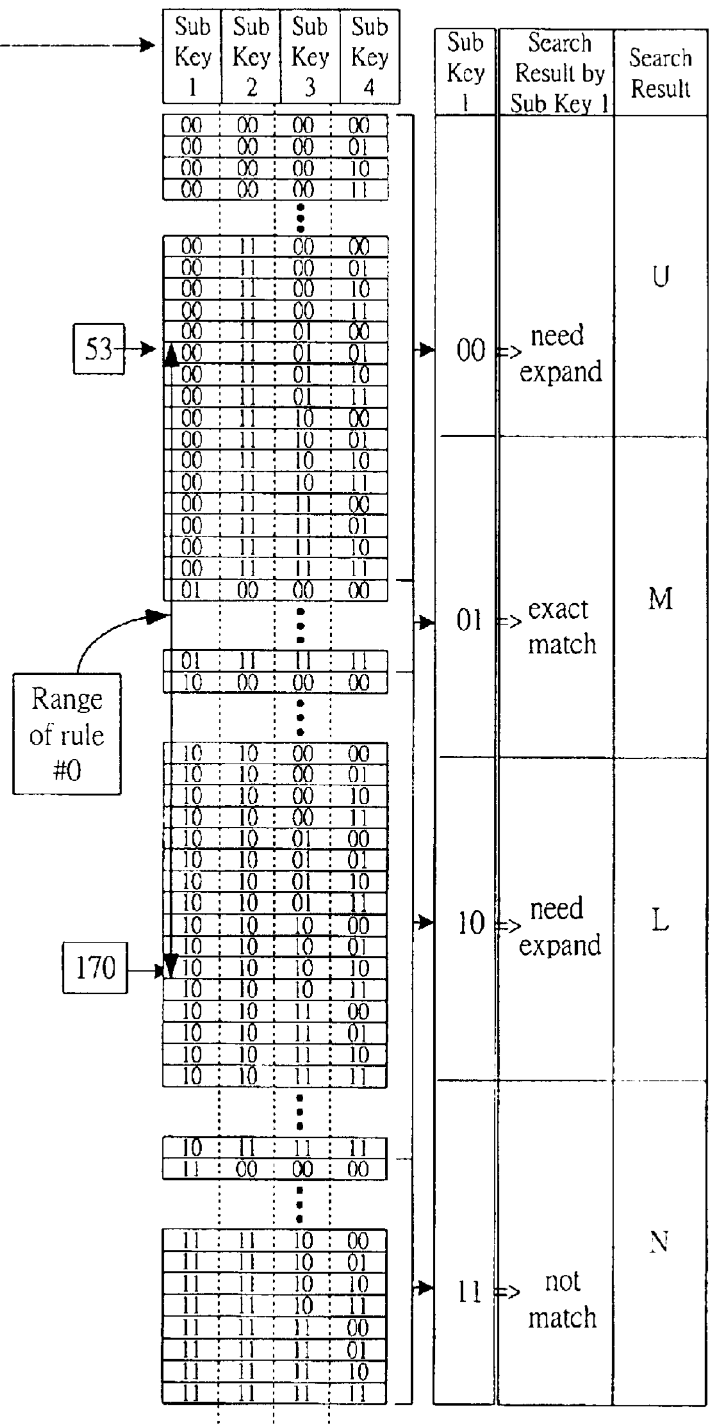

FIG. 8 illustrates the table construction of an embodiment which has 8 bit data divided into 4 sub-keys. Each table of a sub-key is addressed and searched with 2 bits. With reference to FIG. 8*a*, rule #0 which has a data range from 53 to 170 is used as an example for further description. The binary representation of the start value 53 in rule #0 is 00110101 and the binary representation of the end value 170 is 10101010. The two bits of the first sub-key are first used for search. When the first sub-key value is 00, the data value is from 0 to 63 that can not be determined to be within the data range or not without further search in the upper output table of the next level. Therefore, the entry corresponding to the 00 address is filled with U. When the first sub-key value is 01, the data value is from 64 to 127 that is within the data range. Therefore, the entry corresponding to the 01 address is filled with M.

Similarly, when the first sub-key value is 10, the data value is from 128 to 192 and can not be determined to be within the data range or not without further search in the lower output table of the next level. Therefore, the entry corresponding to the 10 address is filled with L. Finally, when the first sub-key value is 11, the data value is from 192 to 255. Because the data range of the rule #0 is only up to 180, no sub-key value is within the data range of rule #0. Therefore, the entry corresponding to the 11 address is filled with N. As can be seen from FIG. 8*b*, the result table of the first sub-key has encoded entries U, M, L and N for the address 00, 01, 10, and 11 respectively.

As described above, when the first sub-key value is 00, further search in the upper output table of the next level using the second sub-key is necessary. When the first sub-key value is 00 and the second sub-key value is 00, the data value is from 0 to 15 and can not fall in the range 53 to 170 of rule #0. Therefore, the entry corresponding to the 00 address in the upper output table of the second sub-key is filled with N. Similarly, when the first sub-key value is 00 and the second sub-key value is 01 or 10, the data value is either in the range of 16 to 31 or 32 to 47 and can not fall in the range of rule #0 either. The corresponding entries are filled with N. When the first sub-key value is 00 and the second sub-key value is 11, the data value is between 48 to 63 and requires further search in the next level to determine if it is in the data range of 53 to 170. Therefore, the entry corresponding to the 11 address is filled with U. As a result, the upper output table constructed for the second sub-key has entries N, N, N and U. When the first sub-key value is 00, this upper output table is further searched.

Similarly, the tables of each sub-key can be constructed according to the search results at each level as shown in FIG. 8*c*. The tables are then encoded and combined to form the rule mapping table shown in FIG. 8*d*. From the example illustrated in FIG. 8, it can also be seen that because the data range is continuous, an upper output table can only introduce another upper output table in the next level and a lower output table can only introduce another lower output table in the next level.

In the conventional range search, when the search in a table requires further search in other tables, the entry in the table is usually the address of the memory location of the next table to be searched. Because a memory address requires many bits, the construction of the table takes very large memory space. According to this invention, the entry in an rule mapping table takes only two bits to represent the four possibilities that are exact match, no match, further search in an upper output table, and further search in a lower output table. The upper and lower output tables are arranged in certain pre-set locations. For example, the output tables are arranged in the rule mapping table in the order of the first output table, the upper output table in the second level, the lower output table in the second level, the upper output table in the third level, the lower output table in the third level, . . . , and so forth. It is not necessary to record the memory locations of the upper and lower output tables. The tables can be fetched in sequence one after another. Therefore, the required memory space is significantly reduced.

Take an example of a range search having 1024 rules with 16 bit data. If four 4 bit sub-keys are used for addressing in the search, each rule requires 7 output tables to store the data. The first search requires one output table. The second search requires an upper output table and a lower output table. The third search requires an upper output table and a lower output table. The final search also requires an upper output table and a lower output table. Because there are 7 output tables, each output table has $2^4$ entries and each entry has 2 bits, the required memory space is $2^4 \times 2 \times 7 = 224$ bits=28 bytes. For 1024 rules, the total memory space required is 28k bytes. As mentioned before, the entries in the last table only need 1 bit to represent and the total memory space can be reduced to 24k bytes.

As far as the number of searches and the search speed are concerned, the search results of one search can be read out all at once in two clocks. Because some of the result may be exact match, no match, further search in an upper output table or further search in a lower output table, it would be less efficient if further search is done only after the previous search result is available. According to this invention, all further searches in upper and lower output tables are always done and a circuit in a post stage is used to determine whether the search results are needed or not. If the data of the range search is divided into n sub-keys, all required search results can be accomplished in 2n clocks regardless of the number of rules. The example illustrated in FIG. 8 only requires 4 searches.

According to the present invention, the required memory space depends on the number of sub-keys used in the range search and the number of bits in each sub-key. The invention has the freedom of dividing the input data into multiple sub-keys. However, the trade-off between the number of searches and the total memory space required has to be made. The longer the number of bits is in a sub-key, the more the memory space is required for storing the table entries. However, less number of searches would be required.

Take the example of a range search having 1024 rules with 16 bit data discussed before. If the data for the range search is divided into 4 sub-keys each having 4 bits, 28k bytes of memory space are required as computed before and the number of searches is four. If the data for the range search is divided into 2 sub-keys each having 8 bits, the memory space required becomes $2^8$ (entries/table)×2 (bits/entry)×3 (tables/rule)×1024 (rules)=192K bytes. Compared with the case of using 4 sub-keys each having 4 bits, the required memory space increases 7 times although the number of searches is decreased to 2 and the search is completed in 4 clocks. If search time is permitted, the design that requires smaller memory space is a better one. FIG. 9 compares the number of searches, the number of output tables and the required memory space for the same range search example with sub-keys having 16, 8, 4, 2 and 1 bits respectively.

To simplify the circuit of implementing the range search of this invention, the search results that include no match, exact match, further search in an upper output table, and further search in a lower output table are encoded as 00, 01, 10 and 11. If the results are 00 or 01, the high order bit of the two bit codes is 0 and the search ends. If the results are 10 or 11, the high order bit of the two bit codes is 1 and further search is required. Therefore, whether the search has ended or further search is required can be determined by using only the high order bit. Therefore, the circuit can be simplified.

FIG. 10 shows a hardware description language Verilog representation of a post stage circuit for receiving the search result at each level in the rule mapping table and determining if the search result should be the final output or ignored, or further inputs should be processed to implement the range search method of this invention. The circuit size is small and it does not depend on the number of bits in the input data.

Figure 11:
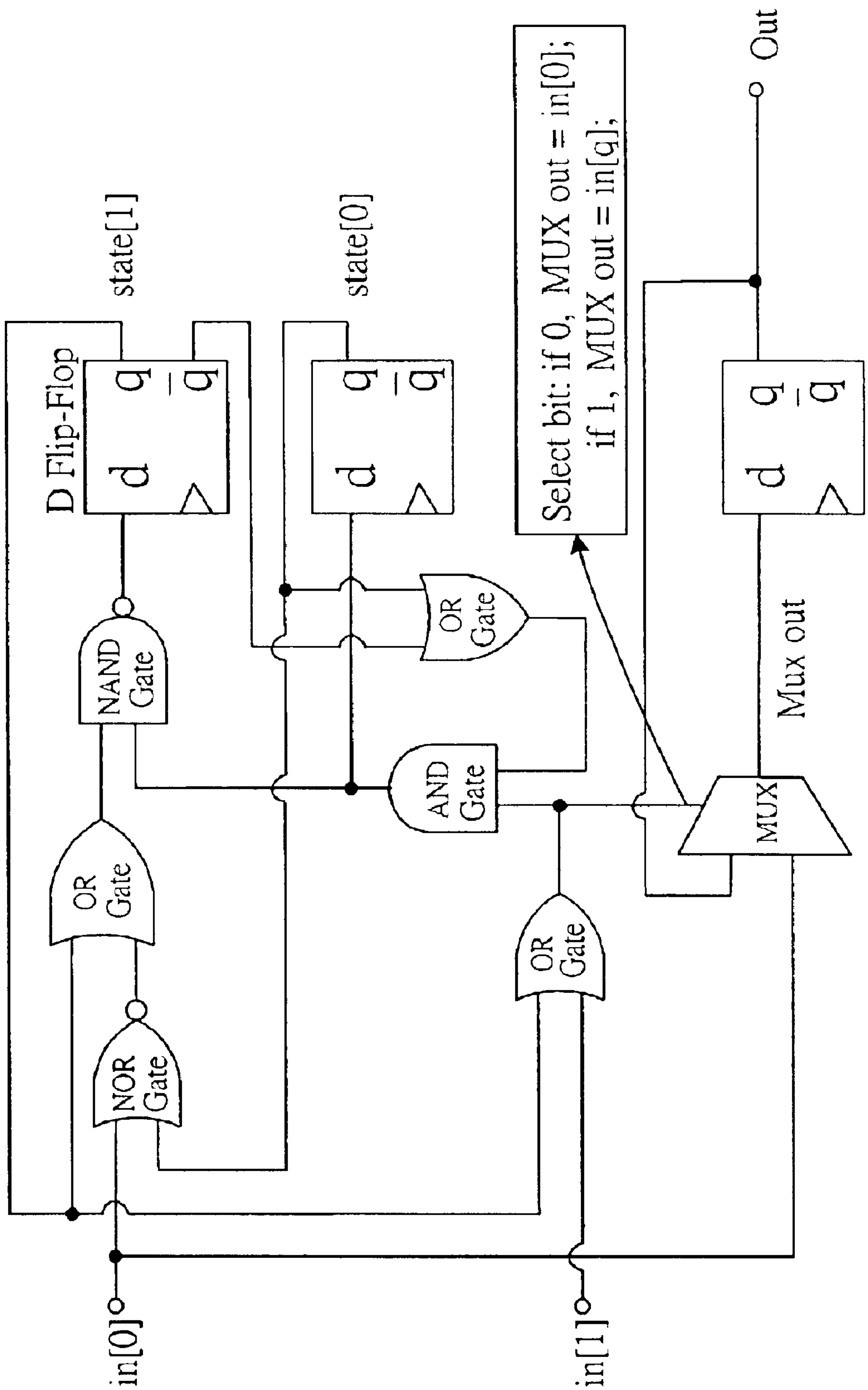
FIG. 11 is a hardware implementation of the circuit described in FIG. 10.

As described before, for the example of a range search having 1024 rules with 16 bit data, the data can be divided into 4 sub-key each having 4 bits to construct the tables. In order to speed up the search, all rules can be searched at once except for the first search in the first output table that uses the first sub-key. Regardless of the results in the first search, the upper output table in the second level is searched using the second sub-key and the lower output table in the second level is also searched using the second sub-key. Similarly, the upper and lower output tables of the third and fourth levels are all searched. Finally, the circuit shown in FIG. 11 is used to determine if the search results are necessary or not.

Except for the first level, each level after has an upper output table and a lower output table. Therefore, there are first output table, upper and lower output tables of the second level, upper and lower output tables of the third level, and upper and lower output tables of the fourth level for the example just described. A search result is generated from each output table until all 7 output tables are searched. At each clock, the search result is sent to the inputs, i.e. in[1:0], of the circuit shown in FIG. 11. At the first clock, the search result of the first output table is sent to in[1:0]. At the second clock, the search result of the upper output table of the second level is sent to in[1:0]. At the third clock, the search result of the lower output table of the second level is sent to in[1:0], . . . , and so forth. At the 7$^{th}$ clock, the lower output table of the fourth level is sent to in[1:0]. At the 8$^{th}$ clock, the search result is exact match if the output of the circuit is 1 and the search result is no match if the output of the circuit is 0. Finally, a priority encoder determines the highest priority rule that has exact match as the search result if there are more than one rule that have exact match.

In the circuit shown in FIG. 10, state[1:0] is represented by 2 bits to indicate the current status of the search. There are four different states including UNIT, LOOKUP, FINAL and IGNORE. At the beginning of the search, the state is set to INIT. The flow of the circuit description in FIG. 10 will be described in detail and then the logic in the hardware circuit shown in FIG. 11 will be proven to match the logic in the circuit description of FIG. 10.

With reference to FIG. 10, at clock 0, the state is INIT. From clock 1 to clock 7, the search results of the first output table, the upper output table in the second level, the lower output table in the second level, the upper output table in the third level, the lower output table in the third level, the upper output table in the fourth level, and the lower output table in the fourth level are sent to the circuit respectively. The circuit determines whether the results of these seven output tables are needed.

After clock 0, the state is INIT, At clock 1, if the input is 10 which represents further search in the upper output table of the second level, the next input to the circuit at clock 2 must be processed because it is for further search in the upper output table. Consequently, the state is set to LOOKUP to indicate that the input of the next clock is meaningful and needs to be processed. If the input at clock 1 is 11 which represents further search in the lower output table of the second level, the next input to the circuit at clock 2 should be ignored because it is the search result of the upper output table in the second level. Therefore, the state is set to IGNORE to indicate that the next input is to be ignored. If the input at clock 1 is 00 or 01 that represents no match or exact match, no further search is necessary. Therefore, the output of the circuit is 0 or 1 accordingly and the state is set to FINAL.

The state of LOOKUP indicates that further processing is necessary. At this state, if the input to the circuit is 00 or 01 that represents no match or exact match, no further search is necessary. The output of the circuit is 0 or 1 respectively and the state is set to FINAL. If the input to the circuit is neither 00 nor 01, it indicates that further search in the next level is necessary. As discussed before, a search in an upper output table can only introduce a further search in an upper output table of the next level and a search in a lower output table can only introduce a further search in a lower output table of the next level. Therefore, the next input is to be ignored because it is the unnecessary search result of an upper or lower output table in the next level. The state is set to IGNORE.

The state of FINAL indicates that the search has completed and it has been determined that the rule is either satisfied or dissatisfied with the input data. Regardless of any further inputs, the output should stay unchanged and the state should stay FINAL to ignore any further inputs.

The state of IGNORE can be the next state of the INIT state or LOOKUP state as described in the previous paragraphs. If the previous state is INIT, it means that the search result of the first output table has required another search in the lower output table of the second level. As the upper and lower output tables are always done, the current input must be the search result of the upper table in the second level and should be ignored. However, the next input must be processed. Therefore, the state is set to LOOKUP. Alternatively, the state IGNORE may come from a LOOKUP state in which a search in an upper output table has introduced a further search in an upper output table of the next level or a search in a lower output table has introduced a further search in a lower output table of the next level. Therefore, the current input must be ignored. Similarly, it also means that the next input should be processed.

The logic of the hardware circuit shown in FIG. 11 is now explained using the tables of FIG. 12 in which logic values of each node for states INIT, LOOKUP, FINAL and IGNORE are tabulated. When the state is INIT, state[1]=0 and state[0]=0. FIG. 12 lists the logic value of each node in the circuit of FIG. 11 for input in[1:0]=00, 01, 10, and 11 respectively. As can be seen, when the input in[1:0] is 00, the next output is 0 and the next state[1:0] is 10 which means FINAL. When the input in[1:0] is 01, the next output is 1 and the next state[1:0] is also 10 which means FINAL. When the input in[1:0] is 10, the next state[1:0] is 01 which means LOOKUP. When the input in[1:0] is 11, the next state[1:0] is 11 which means IGNORE. The logic listed in the table of FIG. 12 for state=INIT is identical to the logic described in FIG. 10.

When the state is LOOKUP, state[1]=0 and state[0]=1. FIG. 12 lists the logic values of each node in the circuit of FIG. 11 for input in[1:0]=00, 01, 10, and 11 respectively. As can be seen, when the input in[1:0] is 00, the next output is 0 and the next state[1:0] is 10 which means FINAL. When the input in[1:0] is 01, the next output is 1 and the next state[1:0] is also 10 which means FINAL. When the input in[1:0] is 10, the next state[1:0] is 11 which means IGNORE. When the input in[1:0] is 11, the next state[1:0] is 11 which means IGNORE. The logic listed in the table of FIG. 12 for state=LOOKUP is identical to the logic described in FIG. 10.

When the state is FINAL, state[1]=1 and state[0]=0. At this state, the next state[1:0] is always 10 which means FINAL no matter what the input in[1:0] is. The logic listed in the table of FIG. 12 for state=FINAL is also identical to the logic described in FIG. 10.

When the state is IGNORE, state[1]=1 and state[0]=1. At this state, the next state[1:0] is always 01 which means LOOKUP no matter what the input in[1:0] is. The logic listed in the table of FIG. 12 for state=IGNORE is also identical to the logic described in FIG. 10.

From the above discussion, it is proven that the logic of the hardware circuit in FIG. 11 implements the range search method of the present invention. In order to search all rules in parallel, each rule requires such a circuit to determine if the input data satisfies the rule. According to the invention, the input data is divided into sub-keys. The value of each sub-key is used as an address for searching until the output of the circuit is 1 that means the data satisfies the rule or the output is 0 that means the data does not satisfy the rule.

In summary, for a range search with n bit data and pre-determined rules, the table construction procedure can be described as follows:

(1) Divide the n bit data into k sub-keys $m_1, m_2, m_3, \ldots, m_k$ from the high order bit to the low order bit, wherein $n, m_1, m_2, m_3, \ldots, m_k$ are positive numbers.

(2) To construct the output tables for a given rule, read the start value and the end value of the data range and represent them in binary format.

(3) Construct a first output table having an entry for each possible value of the binary representation of the first sub-key. Each entry is filled with a 2 bit value representing no match, exact match, further search in an upper output table or further search in a lower output table. The first sub-key can be represented in binary format as $x_1^1x_2^1x_3^1 \ldots x_{m1}^1$, wherein each $x_1^1$ may be 0 or 1. The smallest value of the possible input data with the first sub-key has a binary representation Key_1_min=$x_1^1x_2^1x_3^1 \ldots x_{m1}^1 00 \ldots 0$, wherein the number of trailing 0 is n-$m_1$. The largest value of the possible input data with the first sub-key has a binary representation Key_1_max=$x_1^1x_2^1x_3^1 \ldots x_{m1}^1 11 \ldots 1$, wherein the number of trailing 1 is n-$m_1$. The start and end values of the rule have binary representations denoted by Start and End respectively. The entries in the first output table are filled according to the following rules for every possible value of $x_1^1x_2^1x_3^1 \ldots x_{m1}^1$:

(a) If Key_1_max<Start, all entries corresponding to $x_1^1x_2^1x_3^1 \ldots x_{m1}^1$ are filled with the encoded value of no match, i.e., 00, because none of the first sub-key values is within the data range.

(b) If Key_1_min<Start and Start≦Key_1_max≦End, all entries corresponding to $x_1^1x_2^1x_3^1 \ldots x_{m1}^1$ are filled with the encoded value of further search in an upper output table, i.e., 10, because some lower part of the first sub-key values are within the data range.

(c) If Start≦Key_1_min and Key_1_max≦End, all entries corresponding to $x_1^1x_2^1x_3^1 \ldots x_{m1}^1$ are filled with the encoded value of exact match, i.e., 01, because all of the first sub-key values are within the data range.

(d) If Start≦Key_1_min≦End and End<Key_1_max, all entries corresponding to $x_1^1x_2^1x_3^1 \ldots x_{m1}^1$ are filled with the encoded value of further search in a lower output table, i.e., 11, because some higher part of the first sub-key values are within the data range.

(e) If End<Key_1_min, all entries corresponding to $x_1^1x_2^1x_3^1 \ldots x_{m1}^1$ are filled with the encoded value of no match, i.e., 00, because none of the first sub-key values is within the data range.

(4) For each $k^{th}$ sub-key, an upper output table and a lower output table are constructed. Assume that the first sub-key value is $x_1^1x_2^1x_3^1 \ldots x_{m1}^1$, the second sub-key value is $x_1^2x_2^2x_3^2 \ldots x_{m2}^2, \ldots$, and the $k^{th-1}$ sub-key value is $x_1^{k-1}x_2^{k-1}x_3^{k-1} \ldots x_{m(k-1)}^{k-1}$, respectively in binary representation. If the binary representation of the $k^{th}$ sub-key value is $x_1^kx_2^kx_3^k \ldots x_{mk}^k$, the smallest value of the possible input data has a binary representation Key_k_min=$x_1^1x_2^1x_3^1 \ldots x_{m1}^1 x_1^2x_2^2x_3^2 \ldots x_{m2}^2 \ldots x_1^{k-1}x_2^{k-1}x_3^{k-1} \ldots x_{m(k-1)}^{k-1} x_1^kx_2^kx_3^k \ldots x_{mk}^k 00 \ldots 0$, wherein the number of trailing 0 is n−($m_1$+$m_2$+ . . . +$m_k$). The largest value of the possible input data has a binary representation Key_k_max=$x_1^1x_2^1x_3^1 \ldots x_{m1}^1 x_1^2x_2^2x_3^2 \ldots x_{m2}^2 \ldots x_1^{k-1}x_2^{k-1}x_3^{k-1} \ldots x_{m(k-1)}^{k-1} x_1^kx_2^kx_3^k \ldots x_{mk}^k 11 \ldots 1$, wherein the number of trailing 1 is n−($m_1$+$m_2$+ . . . +$m_k$). The entries in the upper output table are filled according to the following rules for every possible value of $x_1^kx_2^kx_3^k \ldots x_{mk}^k$:

(a) If Key_k_max<Start, all entries corresponding to $x_1^kx_2^kx_3^k \ldots x_{mk}^k$ are filled with the encoded value of no match, i.e., 00, because none of the $k^{th}$ sub-key values is within the data range.

(b) If Key_k_min<Start and Start≦Key_k_max≦End, all entries corresponding to $x_1^kx_2^kx_3^k \ldots x_{mk}^k$ are filled with the encoded value of further search in an upper output table, i.e., 10, because some lower part of the $k^{th}$ sub-key values are within the data range.

(c) If Start≦Key_k_min and Key_k_max≦End, all entries corresponding to $x_1^kx_2^kx_3^k \ldots x_{mk}^k$ are filled with the encoded value of exact match, i.e., 01, because all of the $k^{th}$ sub-key values are within the data range.

The entries in the lower output table are filled according to the following rules for every possible value of $x_1^kx_2^kx_3^k \ldots x_{mk}^k$:

(a) If Start≦Key_k_min and Key_k_max<=End, all entries corresponding to $x_1^kx_2^kx_3^k \ldots x_{mk}^k$ are filled with the encoded value of exact match, i.e., 01, because all of the $k^{th}$ sub-key values are within the data range.

(b) If Start≦Key_k_min≦End and End<Key_k_max, all entries corresponding to $x_1^kx_2^kx_3^k \ldots x_{mk}^k$ are filled with the encoded value of further search in a lower output table, i.e., 11, because some upper part of the $k^{th}$ sub-key values are within the data range.

(c) If End<Key_k_min, all entries corresponding to $x_1^kx_2^kx_3^k \ldots x_{mk}^k$ are filled with the encoded value of no match, i.e., 00, because all of the $k^{th}$ sub-key values are within the data range.

(5) The above step (4) is repeated for each k=2, 3, . . . , K until all the upper and lower output tables are constructed. The tables are then arranged in a sequential order of the first output table, the upper output table of the second sub-key, the lower output table of the second sub-key, . . . , the upper output table of the $K^{th}$ sub-key, and the lower output table of the $K^{th}$ sub-key to form a rule column. The rule column of a given rule is thus constructed.

(6) The above steps of (2) to (5) are repeated until the rule columns of all the rules are completely constructed. The rule columns are arranged in parallel to form a rule mapping table for the range search.

The rule mapping table constructed according to the procedures described above can be used for parallel searches of the range search in the present invention. The steps of the range search is as follows:

(1) Read an input data. The n bit data is divided into K sub-keys of $m_1, m_2, m_3, \ldots, m_K$ bits from the high order bit to the low order bit, wherein n, $m_1, m_2, m_3, \ldots, m_K$ are positive numbers.

(2) The binary representation of the first sub-key value is used as the address for searching in the first output table of every rule in parallel. The output of each search result is an encoded 2 bit value which is sent to a post-stage circuit. The encoded 2 bit value has four possible results:
   (a) The 2 bit value represents exact match and the input data satisfies the rule.
   (b) The 2 bit value represents no match and the input data does not satisfy the rule.
   (c) The 2 bit value represents further search in an upper output table is necessary. This means that the input data can not be completely determined if it satisfies the rule or not and further search in the upper output table of the second level using the second sub-key is necessary.
   (d) The 2 bit value represents further search in a lower output table is necessary. This means that the input data can not be completely determined if it satisfies the rule or not and further search in the lower output table of the second level using the second sub-key is necessary.

(3) Use the binary representation of the $k^{th}$ sub-key value to search the upper and lower output tables of the $k^{th}$ level, wherein k=2, 3, . . . , K. The search result which is encoded into a 2 bit value is sent to the post-stage circuit described in step (2). If the search result indicates further search is necessary, the $(k+1)^{th}$ sub-key is used for searching in the upper and lower output tables of the $(k+1)^{th}$ level.

The above steps (2) and (3) in the range search procedure search all rules in one level in parallel. The 2-bit value of the search result in each rule can be different. If the result is no match or exact match, no further search is necessary. Otherwise, further search in the next level is necessary. In order to do all the searches in parallel, the present invention uses the $k^{th}$ sub-key value as the address for searching in both upper and lower output tables of the $k^{th}$ level when the previous search result in the $(k-1)^{th}$ level indicates further search is required regardless of the type of further search. If the search result in the $(k-1)^{th}$ level indicates exact match or no match, the following searches from $k^{th}$ to $K^{th}$ levels is ignored. If the search result in the $(k-1)^{th}$ level indicates further search in an upper output table, only the search result of the upper output table in the $k^{th}$ level is adopted and the search result of the lower output table in the $k^{th}$ level is ignored. Similarly, if the search result in the $(k-1)^{th}$ level indicates further search in a lower output table, only the search result of the lower output table in the $k^{th}$ level is adopted and the search result of the upper output table in the $k^{th}$ level is ignored. The decision and selection of the search results are processed by the post-stage circuit according to the following step (4).

(4) The circuit as shown in FIG. 11 is used as the post-stage circuit described in step (2) and (3) to process the results of each rule and determine if the data satisfies the rule. In the initial state, the output of the circuit is 0. In clock 1, clock 2, . . . , clock 2$k$-2, and clock 2$k$-1, the 2 bit search results of the first output table, the upper output table of the second level, the lower output table of the second level, . . . , the upper output table of the $K^{th}$ level and the lower output table of the $K^{th}$ level are sent to the input in[1:0] of the circuit sequentially. The output of the circuit at clock 2K is used to determine if the data satisfies the rule. An output 1 represents exact match and an output 0 represents no match.

(5) If there are more than one rule indicating exact match, a priority encoder is used to select the highest priority rule that is satisfied with the input data.

In summary, the range search of this invention divides the input data into multiple sub-keys for searching in multiple levels. At each level, the value of the sub-key of the level is used as the address for searching. The number of levels required in the range search and the size of the rule mapping table constructed for the range search depend on how the input data is divided. A first output table and at least an upper output table and a lower output table at the next level are constructed iteratively for each rule. The entry of each output table is encoded into a 2 bit value to save memory space. The output tables of each rule are arranged in order from the top to the bottom to form a rule column. All the rules are then arranged in parallel to form a rule mapping table.

When the rule mapping table is searched, the upper and lower output tables of all the rules are searched in parallel at each level using the sub-key value of the level as the address. Because of the parallel searches, the search speed is independent of the number of rules. The circuit implementation is simple and the search is efficient. The range search can be used for search in the data base in which the data is classified according to the ranges. It can also be used in Internet packet classification.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A search method implemented with a computer for finding a rule from a plurality of rules each having an associated range of data, said data having n bits and said method comprising the steps of:
   (a) dividing said n bits into a plurality of sub-keys each having at least one bit, and constructing a rule mapping table having a rule column for each rule of said plurality of rules, each rule column being formed by generating a first output table for a first sub-key, and an upper output table and a lower output table for each remaining sub-key according to the associated range of data of a corresponding rule; and
   (b) dividing an input data into a plurality of input sub-keys for searching through said rule mapping table and determining rules that are satisfied with said input data, the first output table and upper and lower output tables in each rule column being addressed by said plurality of input sub-keys to determine if said input data satisfies a corresponding rule.

2. The search method as claimed in claim 1, wherein said step (b) further determines a highest priority rule as a search result if more than one rule are determined to be satisfied with said input data.

3. The search method as claimed in claim 1, wherein in step (a) a first output table of a first sub-key of a rule column has an entry for each possible value of the first sub-key and the value of each entry is 00, 01, 10 or 11 to represent no match, exact match, further search in an upper output table of a second sub-key or further search in a lower output table of a second sub-key; an upper output table of a $k^{th}$ sub-key of a rule column has an entry for each possible value of the $k^{th}$ sub-key and the value of each entry is 00, 01 or 10 to represent no match, exact match and further search in an upper output table of a next sub-key; and a lower output table of a $k^{th}$ sub-key of a rule column has an entry for each possible value of the $k^{th}$ sub-key and the value of each entry is 00, 01 or 11 to represent no match, exact match and further search in a lower output table of a next sub-key.

4. A search method implemented with a computer for finding a rule from a plurality of rules each having an associated range of data, said data having n bits and said method comprising the steps of:

(a) dividing said n bits into a plurality of sub-keys each having at least one bit, and constructing a rule mapping table having a rule column for each rule of said plurality of rules, each rule column being formed by generating a first output table for a first sub-key, and an upper output table and a lower output table for each remaining sub-key according to the associated range of data of a corresponding rule; and (b) dividing an input data into a plurality of input sub-keys for searching through said rule mapping table and determining rules that are satisfied with said input data, the first output table and upper and lower output tables in each rule column being addressed by said plurality of input sub-keys to determine if said input data satisfies a corresponding rule;

wherein in step (a) a rule column for a given rule is generated according to the steps of:

(a1) determining a start value and an end value from the range of data associated with said given rule and representing said start and end values as Start and End respectively;

(a2) filling each entry in a first output table of a first sub-key according to a first sub-key rule based on a smallest possible first key data Key_1_min, a largest possible first key data Key_1_max, Start and End;

(a3) filling each entry in an upper output table of a $k^{th}$ sub-key according to a $k^{th}$ sub-key upper table rule based on a smallest possible $k^{th}$ sub-key data Key_k_min, a largest possible $k^{th}$ sub-key data Key_k_max, Start and End;

(a4) filling each entry in a lower output table of a $k^{th}$ sub-key according to a $k^{th}$ sub-key lower table rule based on a smallest possible $k^{th}$ sub-key data Key_k_min, a largest possible $k^{th}$ sub-key data Key_k_max, Start and End;

(a5) repeating step (a3) and (a4) for all remaining sub-keys; and (a6) arranging all output tables generated in steps (a2), (a3) and (a4) from top to bottom in the order of a first output table of a first sub-key, an upper output table of a second sub-key, a lower output table of a second sub-key, an upper output table of a third sub-key, a lower output table of a third sub-key, and so forth for all sub-keys to form a rule column for the given rule.

5. The search method as claimed in claim 4, wherein a first sub-key has a binary representation $x_1^1x_2^1x_3^1 \ldots x_{m1}^1$, a smallest possible first key data Key_1_min is $x_1^1x_2^1x_3^1 \ldots x_{m1}^1 00 \ldots 0$ which has $n-m_1$ trailing 0, a largest possible first key data Key_1_max is $x_1^1x_2^1x_3^1 \ldots x_{m1}^1 11 \ldots 1$ which has $n-m_1$ trailing 1, and the first sub-key rule in said step (a2) comprises:

(i) filling all entries corresponding to $x_1^1x_2^1x_3^1 \ldots x_{m1}^1$ with 00 representing no match if Key_1_max<Start;

(ii) filling all entries corresponding to $x_1^1x_2^1x_3^1 \ldots x_{m1}^1$ with 10 representing further search in an upper output table if Key_k_min<Start and Start≦Key_k_max≦End;

(iii) filling all entries corresponding to $x_1^1x_2^1x_3^1 \ldots x_{m1}^1$ with 01 representing exact match if Start≦Key_1_min and Key_1_max≦End;

(iv) filling all entries corresponding to $x_1^1x_2^1x_3^1 \ldots x_{m1}^1$ with 11 representing further search in a lower output table if Start≦Key_1_min≦End and End<Key_1_max; and (v) filling all entries corresponding to $x_1^1x_2^1x_3^1 \ldots x_{m1}^1$ with 00 representing no match if End<Key_1_min.

6. The search method as claimed in claim 5, wherein a second sub-key is $x_1^2x_2^2x_3^2 \ldots x_{m2}^2$, a third sub-key is $x_1^3x_2^3x_3^3 \ldots x_{m3}^3, \ldots,$ a $k^{th-1}$ sub-key is $x_1^{k-1}x_2^{k-1}x_3^{k-1} \ldots x_{m(k-1)}^{k-1}$, a $k^{th}$ sub-key is $x_1^kx_2^kx_3^k \ldots x_{mk}^k$ respectively in binary representation in which $n=m_1+m_2+m_3+\ldots+m_k$, a smallest possible $k^{th}$ sub-key data Key_k_min is $x_1^1x_2^1x_3^1 \ldots x_{m1}^1x_1^2x_2^2x_3^2 \ldots x_{m2}^2 \ldots x_1^{k-1}x_2^{k-1}x_3^{k-1} \ldots x_{m(k-1)}^{k-1}x_1^kx_2^kx_3^k \ldots x_{mk}^k 00 \ldots 0$ which has $n-(m_1+m_2+\ldots+m_k)$ trailing 0, a largest possible $k^{th}$ sub-key data Key_k_max is $x_1^1x_2^1x_3^1 \ldots x_{m1}^1x_1^2x_2^2x_3^2 \ldots x_{m2}^2 \ldots x_1^{k-1}x_2^{k-1}x_3^{k-1} \ldots x_{m(k-1)}^{k-1}x_1^kx_2^kx_3^k \ldots x_{mk}^k 11 \ldots 1$ which has $n-(m_1+m_2+\ldots+m_k)$ trailing 1, and the $k^{th}$ sub-key upper table rule in said step (a3) comprises:

(i) filling all entries corresponding to $x_1^kx_2^kx_3^k \ldots x_{mk}^k$ with 00 representing no match if Key_k_max<Start;

(ii) filling all entries corresponding to $x_1^kx_2^kx_3^k \ldots x_{mk}^k$ with 10 representing search in an upper output table if Key_k_min<Start and Start≦Key_k_max≦End; and (iii) filling all entries corresponding to $x_1^kx_2^kx_3^k \ldots x_{mk}^k$ with 01 representing exact match if Start≦Key_1_min and Key_1_max≦End.

7. The search method as claimed in claim 6, wherein the $k^{th}$ sub-key lower table rule in said step (a4) comprises:

(i) filling all entries corresponding to $x_1^kx_2^kx_3^k \ldots x_{mk}^k$ with 01 representing exact match iff Start≦Key_k_min and Key_k_max<=End;

(ii) filling all entries corresponding to $x_1^kx_2^kx_3^k \ldots x_{mk}^k$ with 11 representing further search in a lower output table if Start≦Key_k_min≦End and End<Key_k_max; and (iii) filling all entries corresponding to $x_1^kx_2^kx_3^k \ldots x_{mk}^k$ with 00 representing no match if End<Key_k_min.

8. A search method implemented with a computer for finding a rule from a plurality of rules each having an associated range of data, said data having n bits and said method comprising the steps of:

(a) dividing said n bits into a plurality of sub-keys each having at least one bit, and constructing a rule mapping table having a rule column for each rule of said plurality of rules, each rule column being formed by generating a first output table for a first sub-key, and an upper output table and a lower output table for each remaining sub-key according to the associated range of data of a corresponding rule; and (b) dividing an input data into a plurality of input sub-keys for searching through said rule mapping table and determining rules that are satisfied with said input data, the first output table and upper and lower output tables in each rule column being addressed by said plurality of input sub-keys to determine if said input data satisfies a corresponding rule;

wherein said step (b) comprises the steps of:

(b1) reading and dividing an n-bit input data into K sub-keys having $m_1$, $m_2$, $m_3$, . . . , $m_K$ bits respectively from high order bit to low order bit, wherein n, $m_1$, $m_2$, $m_3$, . . . , $m_K$ are positive numbers;

(b2) using a first sub-key as an address for searching in the first output table of a first level of each rule to output a search result;

(b3) using a $k^{th}$ sub-key as an address for searching in the upper and lower output tables of a $k^{th}$ level in each rule to output search results, wherein k=2; and (b4) repeating step (b3) for k=3, 4, . . . , K;

wherein the search results of steps (b2), (b3) and (b4) are used to determine if said input data satisfies each rule being searched.

9. The search method as claimed in claim 8, wherein each search result in said steps (b2), (b3) and (b4) is exact match, no match, further search in an upper output table, or further search in a lower output table, said search method stops searching if a search result is exact match or no match, and a next level search continues if a search result is neither exact match nor no match.

10. The search method as claimed in claim 9, wherein in said step (b3) or (b4), the search result of the lower output table at a current level is ignored if the search result of a previous level is further search in an upper output table; and the search result of the upper output table at a current level is ignored if the search result of a previous level is further search in a lower output table.

11. The search method as claimed in claim 8, wherein each search result in said steps (b2), (b3) and (b4) is sent sequentially to a post-stage circuit associated to a rule being searched.

12. The search method as claimed in claim 11, wherein said steps (b2), (b3) and (b4) are performed for each rule in parallel, and each post-stage circuit sends an output to a priority encoder which selects a highest priority rule that is satisfied with said input data.

13. The search method as claimed in claim 11, wherein each search result in said steps (b2), (b3) and (b4) is encoded as 00, 01, 10 or 11, said post stage circuit has an initial state, a lookup state, an ignore state and a final state, and said post stage circuit implements a logic comprising:

(i) transitioning to a final state if 00 or 01 is received by said post stage circuit in an initial state and outputting 0 or 1 respectively;

(ii) transitioning to a lookup state if 10 is received by said post stage circuit in an initial state;

(iii) transitioning to an ignore state if 11 is received by said post stage circuit in an initial state;

(iv) transitioning to a final state if 00 or 01 is received by said post stage circuit in a lookup state and outputting 0 or 1 respectively;

(v) transitioning to an ignore state if 10 or 11 is received by said post stage circuit in a lookup state;

(vi) transitioning to a final state and keeping a previous output regardless of what is received if said post stage circuit is in a final state; and (vii) transitioning to a lookup state regardless of what is received if said post stage circuit is in an ignore state.

* * * * *